INVENTOR.
RAYMOND P. CUMMINGS
BY
PATENT AGENT

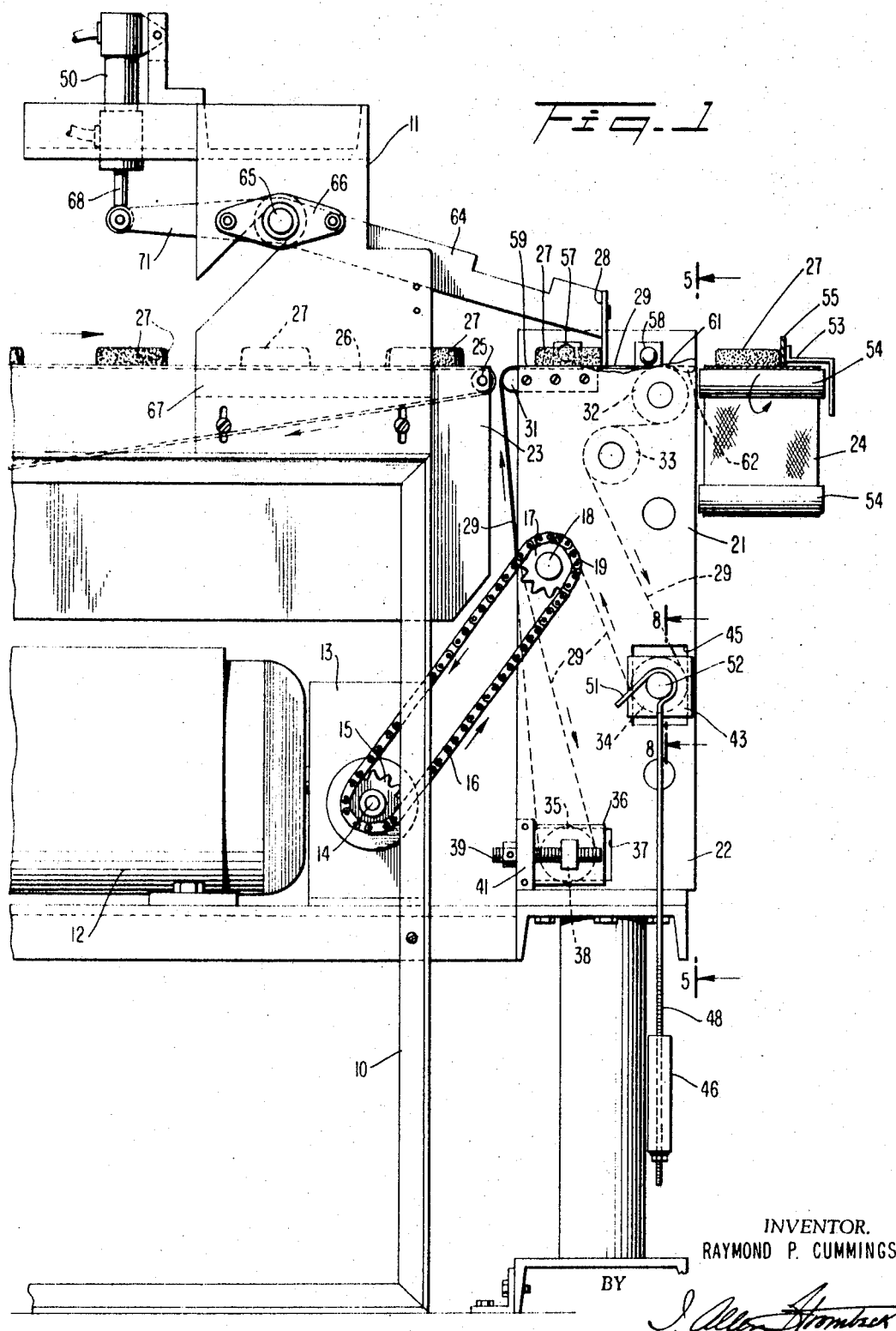

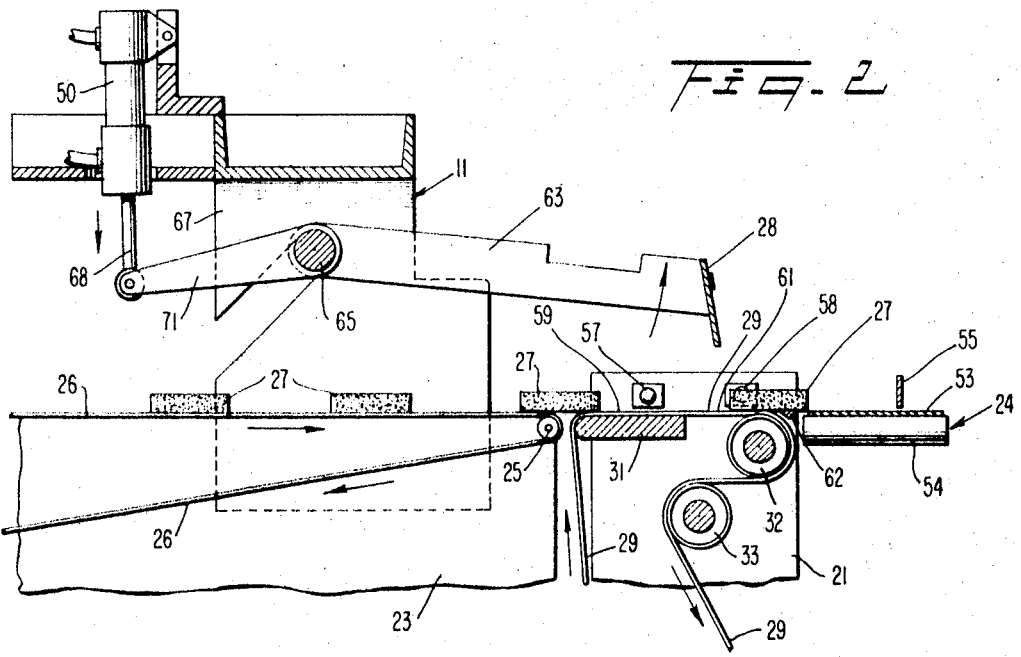
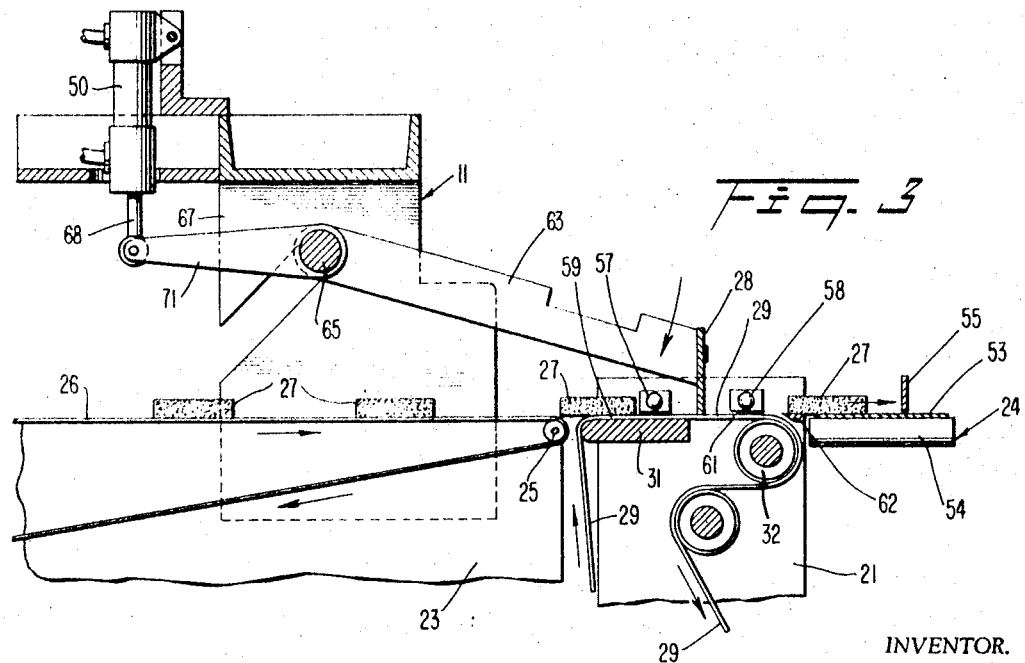

INVENTOR.
RAYMOND P. CUMMINGS

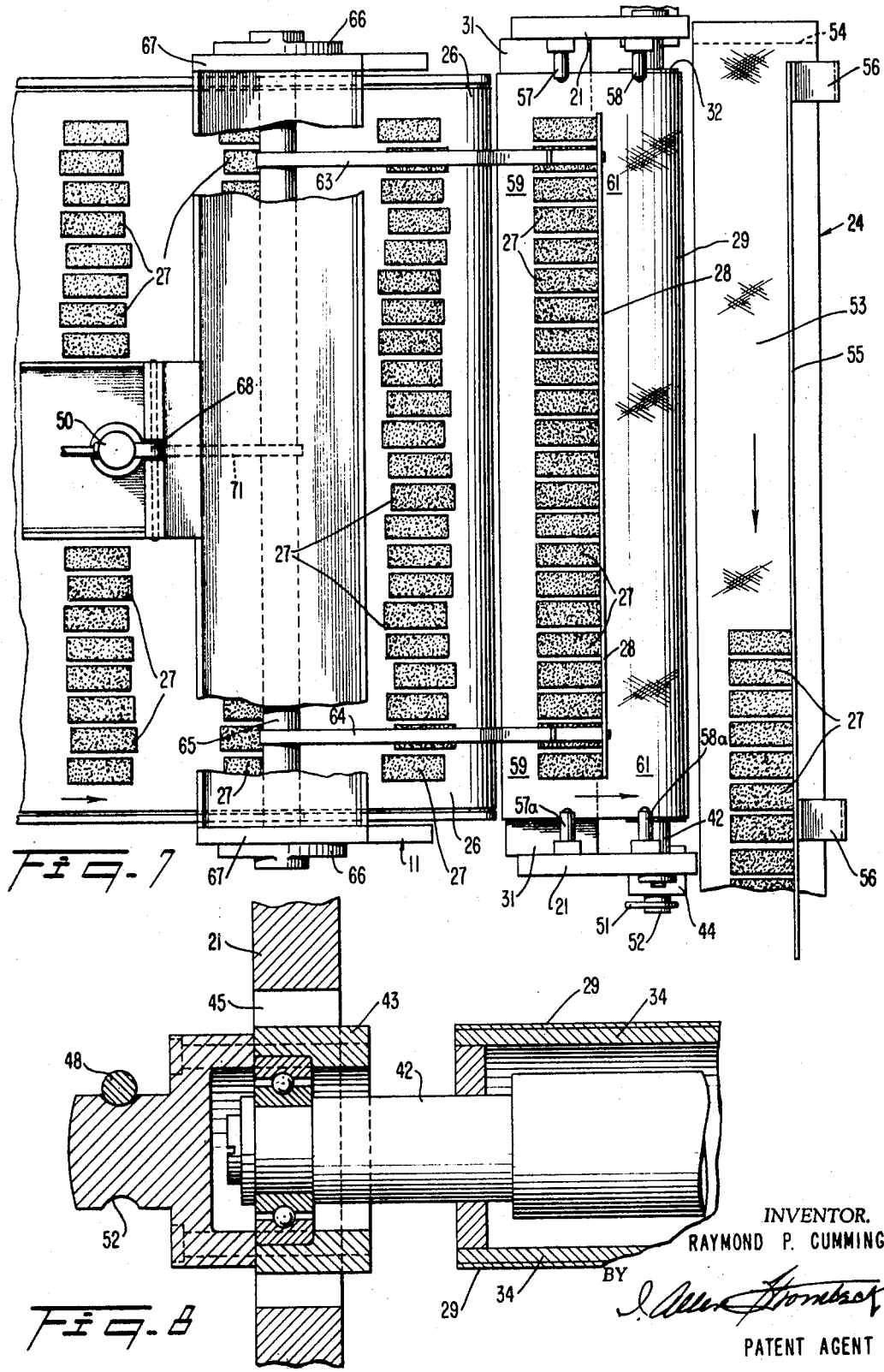

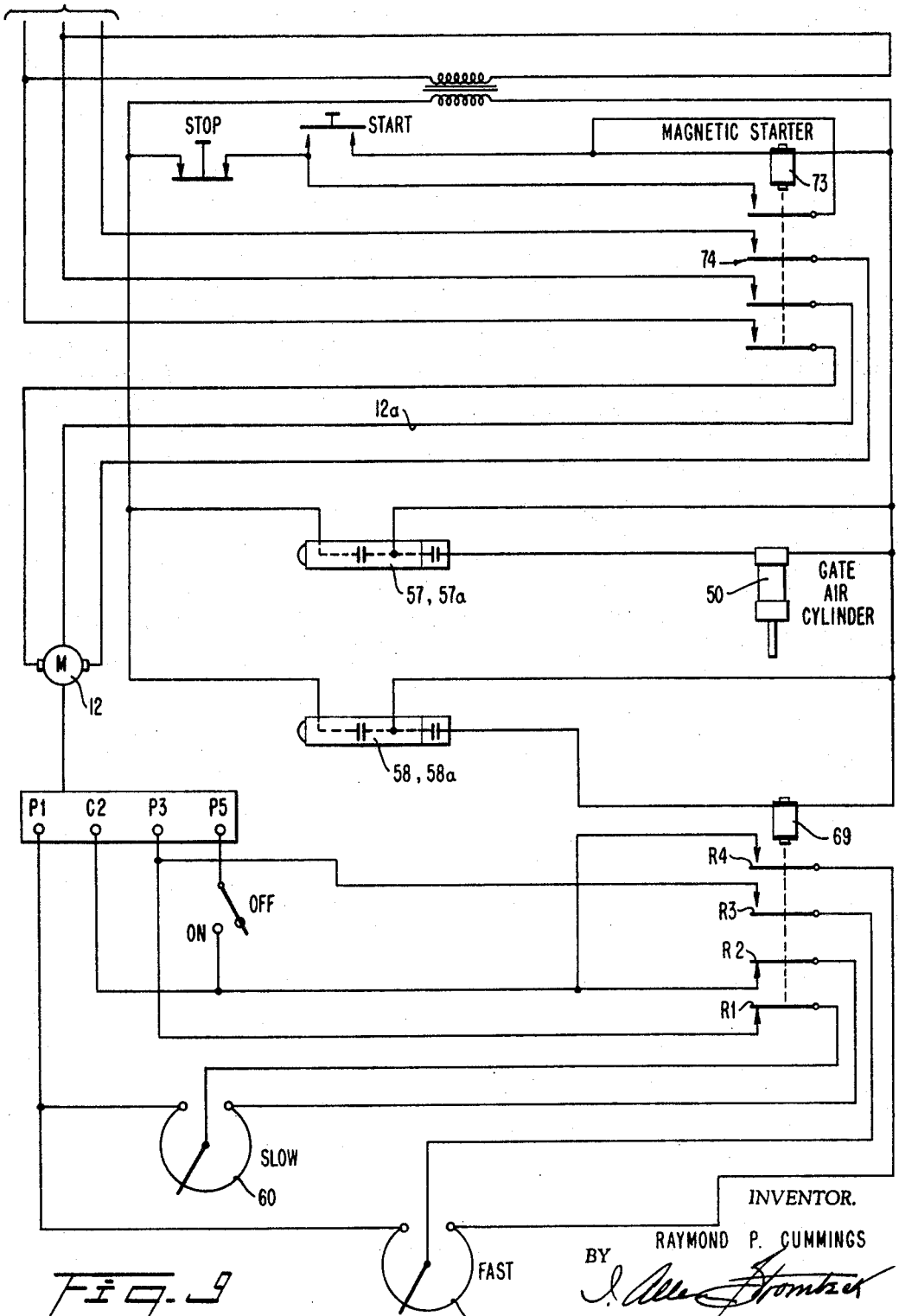

United States Patent Office 3,463,291
Patented Aug. 26, 1969

---

3,463,291
ARTICLE ALIGNING AND ROW ACCUMULATING APPARATUS
Raymond P. Cummings, Franklin Lakes, N.J., assignor to National Biscuit Company, a corporation of New Jersey
Filed Oct. 20, 1967, Ser. No. 676,953
Int. Cl. B65g 47/30
U.S. Cl. 198—30    11 Claims

ABSTRACT OF THE DISCLOSURE

A candy or confectionery bar handling apparatus including a first belt for receiving the bars in random relation in rows extending transversely of said belt, which belt operates alternately at low and high speeds to first align the bars against a vertically adjustable gate and then quickly discharge the rows to a second belt against a stop strip arranged at right angles to said first belt to form a continuous unbroken row, the slow and high speeds of the first belt, and the operation of the gate, being coordinated by the operations of a photoelectric detection and control means.

---

Prior art

A search of the prior are reveals Patent No. 2,751,059 issued to H. Klein et al., June 19, 1956, for an Apparatus for Grouping Conveyed Articles, to be closest to the subject matter of the present application. While this patent discloses a holding gate for articles coming out of a chute, there does not appear to be any means for aligning the articles from a random relation to an aligned formation followed by rapid release to a belt traveling at a right angle therefrom and on which the articles are aligned in one continuous row.

Another patent found is No. 2,052,840 issued to M. H. Nussbaum, Sept. 1, 1936, for Control Mechanism for Beverage Bottle Feeding Conveyors which shows means for separating articles into batches of predetermined number and then feeding the latter. A gate used in this patent is operative in segregating a number of items but not for alignment thereof.

Other patents found include Patent No. 1,042,200 to G. H. Caughrean, Oct. 22, 1912, which provides a gate for selectively permitting a predetermined number of cans to roll into a frame having shelves from which the cans are stacked in a container; and Patent No. 620,820, to C. Ziles, Mar. 7, 1899 which provides gate means for releasing a predetermined number of articles which are aligned on a track in a tank. The art does not show the structure of applicant's machine or the means for quickly aligning and discharging a row of articles consisting of separate rows which are assembled.

An important object of the invention is to feed confectionery bars, that have reached an infeed belt in rows of random order, against a gate for transverse alignment of the bars, quickly propelling the aligned bars of each subsequent row to an outfeed conveyor.

A further object of the invention is to provide means whereby the articles or bars of a row being discharged will be arranged in a single unbroken line to be fed to a packaging or other apparatus in a continuous stream.

Still further objects of the invention include the provision of photo-electric or photo-cell detection means for not only controlling the operation of an aligning gate but operation of a two-speed belt for rapidly aligning the bars in a row and quickly discharging each row to provide a single unbroken column of bars on an outfeed belt; to arrange a set of belts so that no manual assistance is required in advancing the bars into columnar formation; to quickly change the direction of travel of the rows without disarranging the alignment of the bars, and to provide novel two-speed feed means controlled by photo-cell circuit means to direct a fast continuous discharge of the rows past an aligning gate for rapid formation of the aligned bars in a continuously moving column in equidistantly spaced relation.

With these and other objects in view, the invention comprises certain constructions hereinafter described and then particularly pointed out in the claims. A preferred embodiment of the invention is illustrated in the accompanying drawings, in which:

FIGURE 1 is a view in side elevation showing the gate in its down or closed position with the confection bars approaching thereto for transverse alignment;

FIGURE 2 is a fragmentary view of the upper portion of FIGURE 1, in section, showing the gate lifted to its up or open position and an aligned transverse row of confection bars released for travel to a cross feed belt;

FIGURE 3 is a view similar to FIGURE 2 showing the gate dropped to closed or down position in preparation for alignment of the next group or row of confection bars;

FIGURE 7 is a plan view showing the confection bars approaching the aligning gate in random order and an aligned group ready for quick release to the cross feed belt;

FIGURE 8 is an enlarged view in section taken on the line 8—8 of FIGURE 1 showing the structure of the take-up roller, and FIGURE 9 is a schematic circuit showing details of operation of photocells, relays and solenoid air valves.

Figure 4:
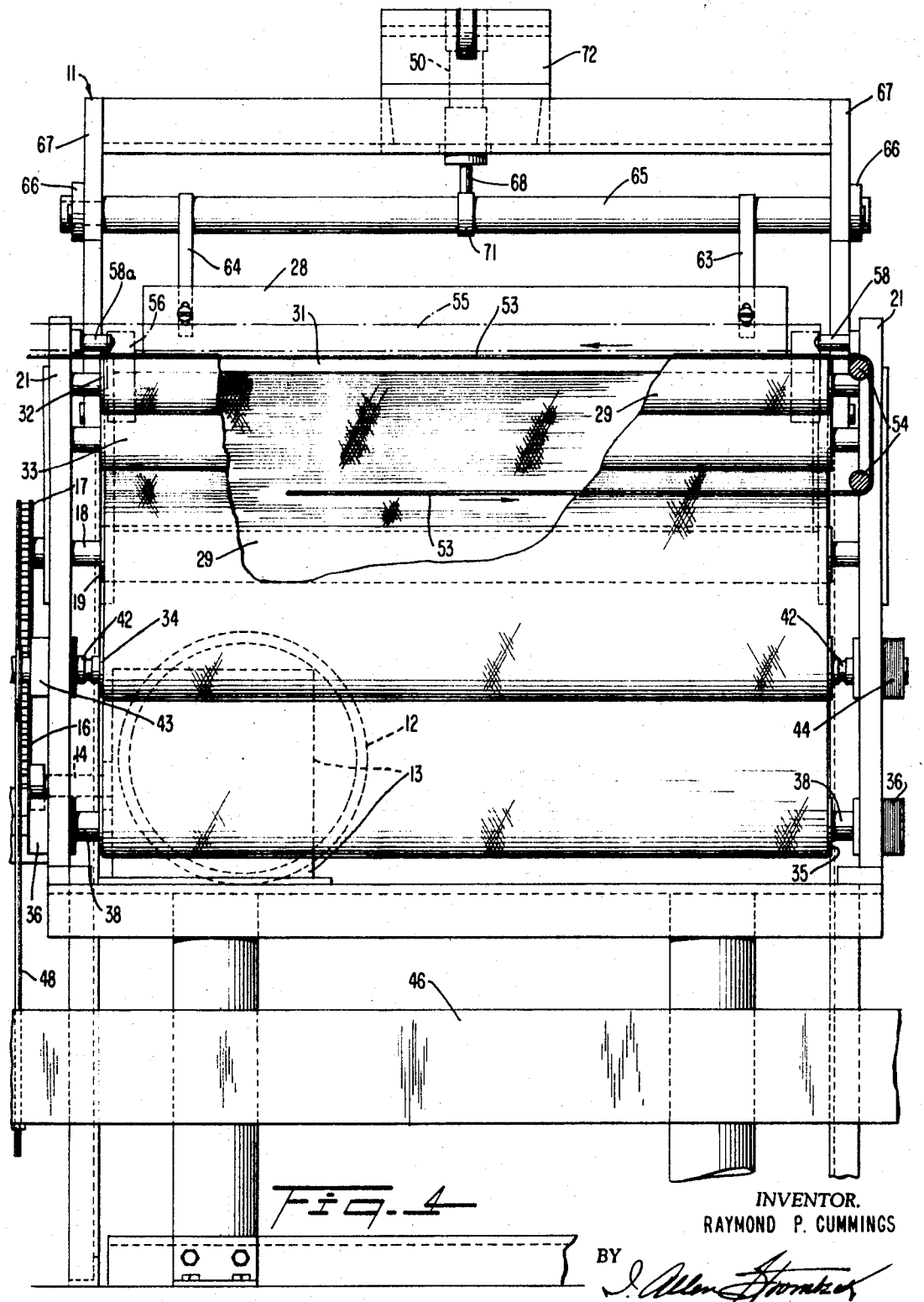
FIGURE 4 is a vertical view looking toward the right side of the machine shown in FIGURE 1 with the gate in lowered position and parts broken away to illustrate the inner feed belts.

Referring to the drawings in detail, 10 indicates a lower frame section surmounted by an upper frame section 11 between side walls or panels of which are mounted operating shafts for the belts of the machine. The frame 10 carries a two-speed motor 12 operating through a gear box 13 to drive a shaft 14 carrying a sprocket gear 15 for driving a sprocket chain 16, which in turn, drives a sprocket gear 17 on the end of a cross shaft 18 on which is mounted a belt roller 19. The shaft 18 is journalled in the side walls or panels 21 of a housing 22 disposed intermediate an infeed section 23 and an outfeed belt mounting section 24. The infeed section 23 has a belt roller 25 pivoted therein over which travels a belt 26 for carrying rows of candy bars or confections 27 received from an enrobing machine or other confectionery processing unit, not shown, which supplies the drive for the belt 26. The confection bars 27 which may be of rectangular shape drop onto belt 26 in transversely random order as seen in FIGURE 7 and are carried into contact with a liftable gate 28 for transverse alignment thereagainst over one area of a transfer two-speed belt 29, to be held in abutment against the gate, as the belt slips thereunder. In this manner, the confection bars 27 are accurately aligned in transverse direction against the gate 28.

Figure 5:
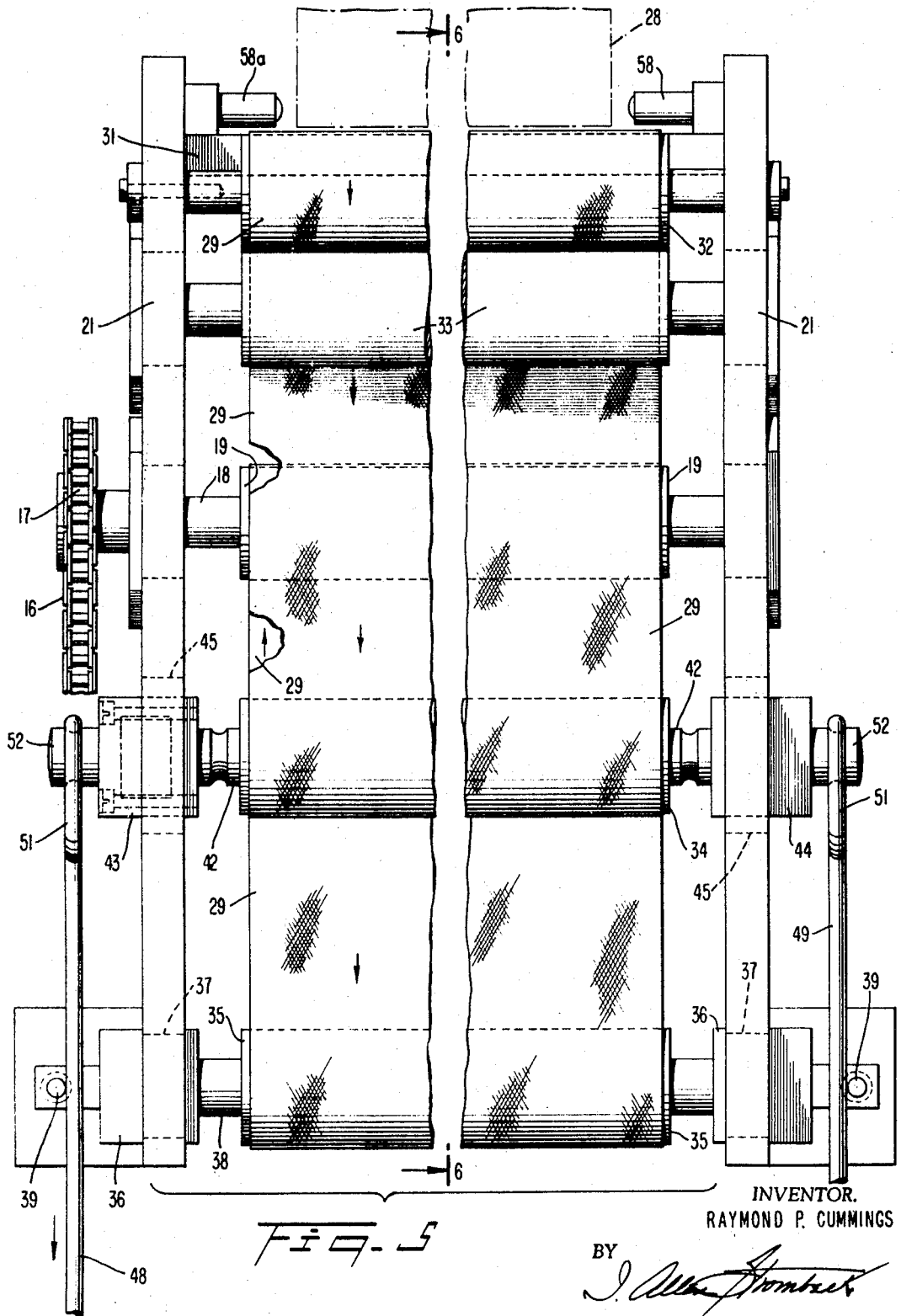
FIGURE 5 is an enlarged view in front elevation of that portion of the machine shown on the line 5—5 of FIGURE 1 illustrating the arrangement of the belting used in driving the machine and advancing the product.
Figure 6:
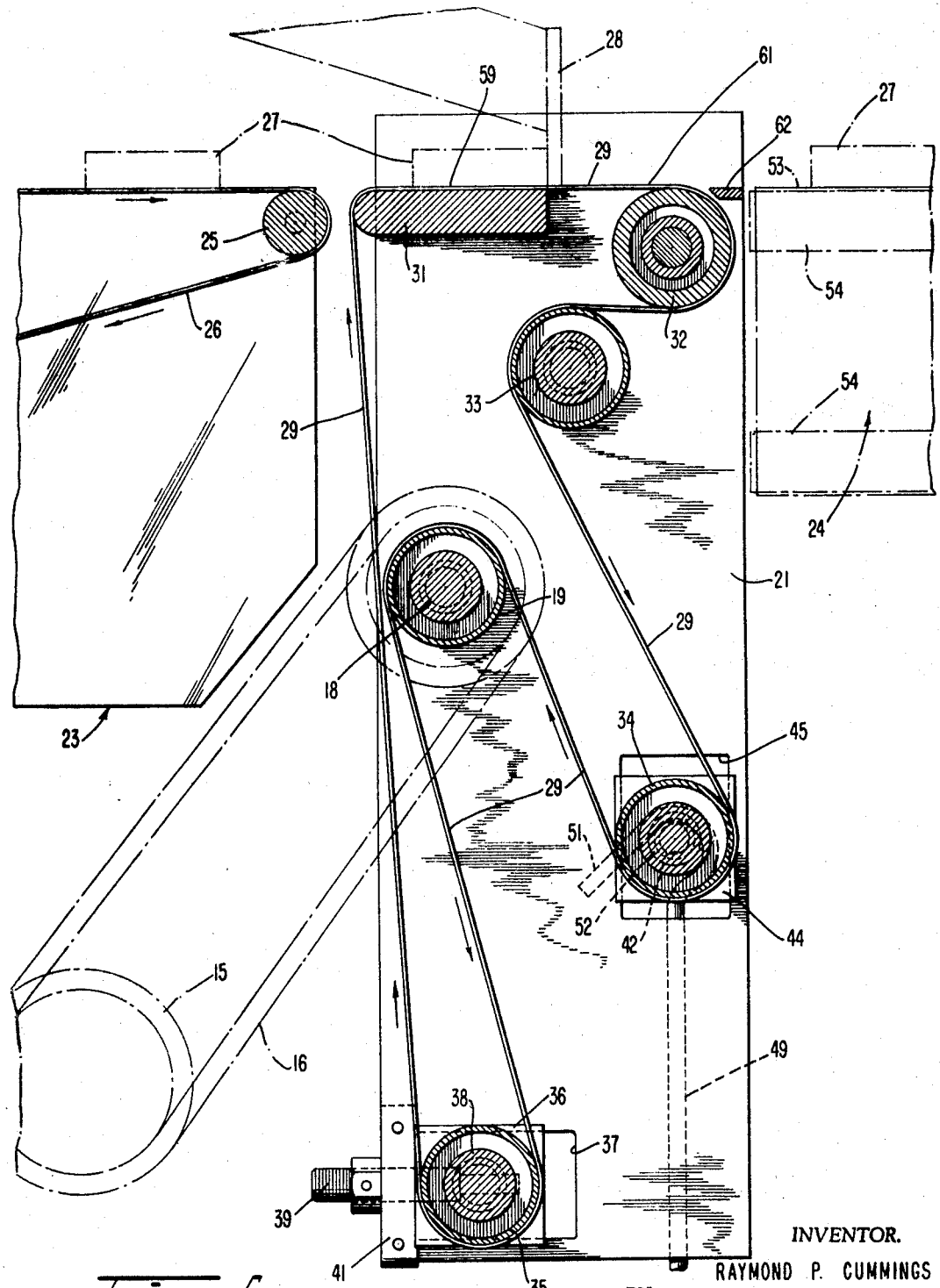
FIGURE 6 is a vertical section on the line 6—6 of FIGURE 5 further showing the driving means.

The belt 29 passes over a nose strip 31, mounted between the side panels 21 with its edge positioned closely adjacent the roller 25. The belt continues over belt rollers 32 and 33, about a take-up roller 34, over the belt roller 19 which is driven by the chain 16, and about an adjusting roller 35. The latter is journalled on shaft 38 in opposed bearing slides 36, in the openings 37. The slides 36 are adjustable by screws 39 operating through bosses 41 secured to said side walls or panels 21. The take-up or tension roller 34, FIGURES 5, 6 and 8, is mounted on a shaft 42 whose opposite ends are journalled in slide plates 43 and 44 mounted for sliding movement in openings 45 of the panels 21. The roller 34 is substantially suspended in the bight of the belt 29 as it moves up and down with the slides, yieldable resistance to which is provided by a counterweight 46 adjustable vertically on rods 48 and 49 respectively, which, at their upper ends are hooked as at 51 in the circumferentially-grooved ends of a stud shaft 52 extending from each slide in axial alignment with the shaft 42. The adjusting roller 35 serves the purpose of keeping the belt 29 running straight, while the take-up roller 34 maintains the proper tension in the belt 29 as it changes speed of operation, as will be explained.

As before noted, the confectionery bars 27 drop onto the conveyor belt 26 in transversely unaligned position, FIGURE 7, and are moved onto the two-speed transfer belt 29 to abut the gate 28, for true transverse alignment, where they are momentarily detained until the belt speed increases and the gate 28 opens. The belt 29 discharges the aligned bars 27 at high speed to an outfeed belt 53 operating over rollers 54 carried in the outfeed section or frame 24. The belt 53 is plastic coated on its outer surface so that the bars 27 will be retained in aligned position against a stop strip 55 suitably supported by brackets 56 slightly spaced above the upper surface of the belt 53, which travels at an angle of 90° to the belt 29 and instantly changes the direction of travel of said bars without disturbing the spacing therebetween and also provides a continuous unbroken row of bars to be fed to a packaging, wrapping machine or the like, not shown.

Referring to FIGURES 2, 3, 4 and 7 it will be seen that the feed of the rows of confectionery bars 27 to the gate 28, by the coactive operation of the belts 26 and 29, along with the accelerated speed of the transfer two-speed belt 29, is controlled by sets of photo-cell detection means 57, 57a and 58, 58a which include commercially purchased delayed-action switches of well-known construction. The detection means are mounted to sense the transverse span of belt 29 in what will be termed the "slow" speed section 59 to the left of gate 28 and in what will be termed the "high" speed or fast section 61 to the right of the gate. The space between belt 29 and outfeed belt 53 is spanned by a bridging strip 62 to facilitate sliding passage of the bars between transfer belt 29 and belt 53 without disrupting the aligned formation of the bars 27. When a row of bars 27 reaches the nose strip section of the belt 29 the latter, due to a potentiometer 60 in the motor circuit, will be traveling at the "slow" speed and the row of bars or even a single bar will break the light beam between the members 57 and 57a and will move on to engage the gate 28 which stays closed until the full complement of bars forming the row arrives as in FIGURE 1 whereupon the delay switch of 57, 57a operates to energize a solenoid air valve 50 which lifts the gate 28 to allow passage of the aligned stack or row. The belt 29 normally operates at low speed but when the gate lifts, relay R3 closes and the motor 12 through the potentiometer 70 accelerates into high speed and the belt travels at the "high" rate to move the stack under the gate, past the detection means 58, 58a and onto the feed out belt 53 to abut the stop strip 55. The switch in the detection means 58, 58a, after the desired delay, opens the relays R1 and R2, closes relays R3 and R4 causing the gate to drop to closed position to stop the next row of bars. The successive rows of bars abut the strip 55 and the coordinated timing of the operation of the gate 28 and the "slow" and "high" speeds of the belt 29 combine to complete a single uninterrupted line of confectionery bars 27 along the discharge belt 53.

The gate 28 consists of a vertically disposed strip extending transversely of the belt 29 at a point between the photo-detection means 57, 57a and 58, 58a so that, when the gate is lowered or closed as seen in FIGURE 1, a row of bars 27 will be arrested in the path of the first photo-detection means. The gate is carried at the free ends of side arms 63 and 64 secured to a rock shaft 65, journalled in bearings 66 in the obliquely slotted side walls 67 of the upper frame section 11. The operation of the gate 28 controls the feeding of successive rows of confection bars 27. At the opposite ends of the upper portions of the side walls 21 there is positioned the elements of the photo-electric detection means above referred to. The rock shaft 65 is oscillated to raise and lower the gate 28 through the medium of the solenoid air valve 50 whose depending rod 68 is pivoted to a center extension arm 71 which is secured to the rock shaft 65 (FIGURES 2, 4 and 7). The air valve 50 is mounted in a bracket 72 of the upper frame section 11.

In FIGURE 9, the schematic circuit shows the motor circuit 12a controlled from a magnetic starter 73 and bank of relays 74 for said motor circuit, the circuit showing details of operation of the photo-detection units, the relays and the solenoid air valve as will be evident. While reference has been made to slow and fast sections of the belt 29 as at 59 and 61 it is to be understood that the entire belt has slow and fast motions but the fast motion projects the stacks off the belt and onto belt 53 while the slow motion gives the gate 28 time to close and the photo-detection means 57, 57a time to effect the raising of the gate and the speed-up of the belt 29 to fast motion. Through the medium of the two-speed belt 29 and gate 28, along with the photo-detection control means spaced rows of bars arranged in random relation are quickly aligned and assembled on the outfeed belt in one continuous row for discharge as above noted.

The invention is not to be restricted to the precise details of construction shown since various changes and modifications may be made therein without departing from the scope of the invention or sacrificing the advantages to be derived from its use.

What is claimed is:

1. In an article aligning and row accumulating apparatus, the combination of:
   (a) a first means for conveying articles arranged in random order in successive parallel rows,
   (b) means for aligning the articles in each row,
   (c) a second means operable at one speed for conveying said rows to said aligning means for alignment of the articles thereof and operable at another speed for conveying the rows after said alignment, and
   (d) means for accumulating said rows for outfeed discharge in a single continuous row.

2. In an article aligning and row accumulating apparatus, the combination of:
   (a) a first means for conveying articles arranged in random order in rows,
   (b) a second means operable at a first speed for conveying said articles for subsequent alignment thereof,
   (c) means for blocking movement of the articles and aligning the same in a straight row,
   (d) means for operating said blocking means to release the aligned articles for movement,
   (e) said second means being operable at a second speed for conveying said straight rows after release and alignment, and
   (f) means for accumulating said straight rows for outfeed discharge in a single continuous row.

3. In an article aligning and row accumulating apparatus, the combination of:
   (a) a first means for conveying articles arranged in random order in rows,
   (b) a second means operable at a first speed for conveying said articles for subsequent alignment thereof, (c) means for blocking movement of the articles and aligning the same in a straight row, (d) means for releasing the aligned articles for continuous travel, (e) said second means being operable at a second speed in excess of said first speed for conveying said straight rows in one direction of travel after release and alignment, and (f) means for accumulating said straight rows for outfeed discharge in a different direction of travel in a single continuous row.

4. An apparatus as set forth in claim 1, in which:
(a) said second means includes an endless belt,
(b) a motor drive for operating said belt,
(c) circuit means for operating said motor drive at two different speeds, and
(d) control means associated with said belt for controlling said circuit means.

5. An apparatus as set forth in claim 1, in which:
(a) the means for aligning the articles in each row includes a gate,
(b) circuit means for actuating said gate from a lowered to a raised position and vice versa,
(c) photo-electric control means for scanning the areas at opposite sides of the gate, and
(d) circuit means controlled by said photo-electric means for changing the speed of operation of said second means.

6. An apparatus as set forth in claim 1, in which:
(a) the means for accumulating the rows for outfeed includes a belt operating at right angles to said first and second conveying means, and
(b) a stop strip associated with said right-angled belt against which said rows are accumulated in a single continuous row.

7. An apparatus as set forth in claim 2, in which:
(a) circuit controlled motor means are provided for operating said second conveying means at said first and second speeds, and
(b) said article movement blocking means being operable substantially between said first and second speeds.

8. An apparatus as set forth in claim 2, in which:
(a) circuit controlling detection and delay means are provided for scanning the blocking and aligning area,
(b) circuit means are provided for controlling the operation of the blocking means in blocking and release movements, and
(c) said delay means providing for aligning movement of said articles against said blocking means before release of the latter and providing for blocking movement of the latter after release of said articles.

9. An apparatus as set forth in claim 1, in which:
(a) said second means for conveying comprises an endless belt disposed between said first means and said accumulating means,
(b) motor means for operating said belt at said first and second speeds,
(c) a circuit including photo-electric detection means scanning said belt transversely at spaced longitudinal points and in flanking relation to said blocking and aligning means, and
(d) said motor means in the circuit being under control of said detection means for varying the speed of said second means and the operation of said blocking and aligning means.

10. An apparatus as set forth in claim 1, in which:
(a) said second means includes an endless belt for passage beneath said article aligning means, and
(b) belt tensioning means including a counterweight movable in a bight in said belt for automatically compensating for changes in the operating speed of the belt to maintain constant tension therein.

11. An apparatus as set forth in claim 3, in which:
(a) said first and second means includes lineally disposed belt means,
(b) said straight row accumulating means including a belt arranged at right angles to and adjacent said second means,
(c) stop strip means extending along said accumulating belt means for guiding said rows for outfeed travel in a single continuous row,
(d) said blocking means including a gate against which the rows are successively pushed and held by said second means, and
(e) circuit controlled means for raising and lowering said gate.

References Cited

UNITED STATES PATENTS 3,308,922    4/1967    Ellis _____ 198—30

EDWARD A. SROKA, Primary Examiner

U.S. Cl. X.R.

198—32